Figure 1:
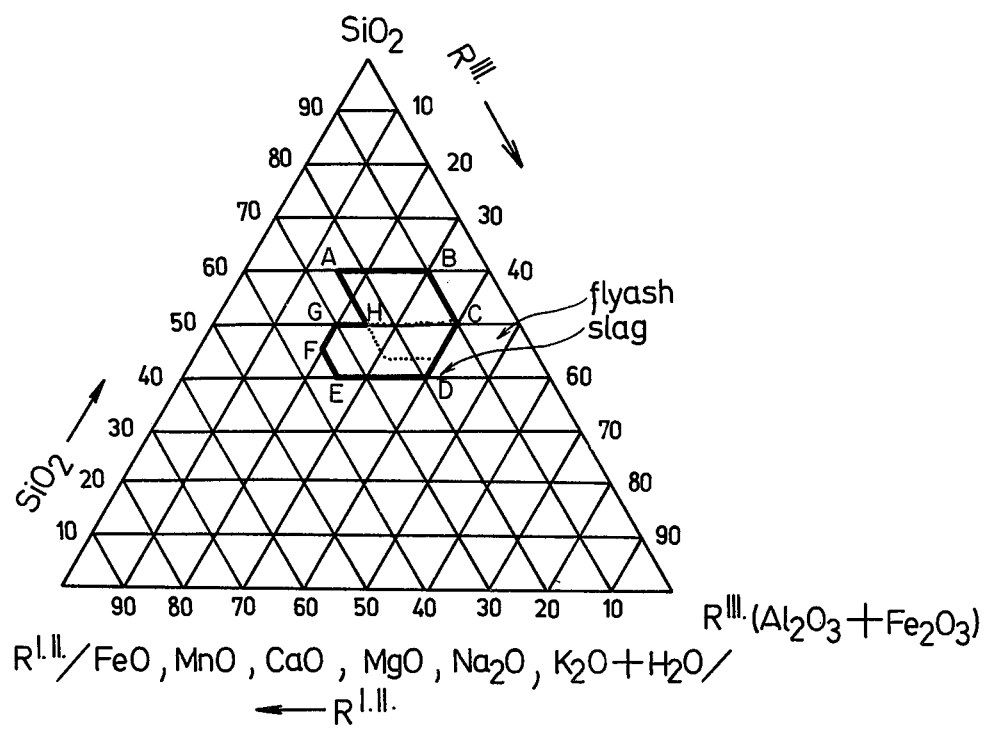

United States Patent [19]

Kapolyi et al.

[11] 3,928,047
[45] Dec. 23, 1975

[54] ARTIFICIAL STONE AND METHOD FOR MAKING THE STONE FROM A COAL BYPRODUCT

[75] Inventors: László Kapolyi; Imre Kubovits, both of Budapest; Ferenc Kaszanitzky, Tatabanya; Aitila Szauó, Dunaharaszti, all of Hungary

[73] Assignee: Tatabanyai Szenbanyak, Tatabanya, Hungary

[22] Filed: July 10, 1974

[21] Appl. No.: 486,996

Related U.S. Application Data

[63] Continuation of Ser. No. 279,253, Aug. 9, 1972, abandoned, which is a continuation-in-part of Ser. Nos. 27,450, April 10, 1970, abandoned, and Ser. No. 27,461, April 10, 1970, abandoned.

[30] Foreign Application Priority Data

Apr. 17, 1969 Hungary .......................... TA 1016

[52] U.S. Cl. .................... 106/39.6; 65/19; 65/33; 106/73.6; 106/DIG. 1
[51] Int. Cl.² .................... C03C 3/22; C03B 35/00; C03B 5/18; C03B 32/00
[58] Field of Search ........ 65/33, 19; 106/39.6, 73.6, 106/DIG. 1

[56] References Cited
UNITED STATES PATENTS

| | | | |
|---|---|---|---|
| 2,932,922 | 4/1960 | Mauritz | 65/33 |
| 3,557,575 | 1/1971 | Beal | 65/33 |
| 3,630,911 | 12/1971 | Schultz | 65/33 |
| 3,677,728 | 7/1972 | Kitaigdrodsky | 65/33 |
| 3,761,235 | 9/1973 | Yamanaka et al. | 65/33 |
| 3,772,041 | 11/1973 | Tochon | 106/39.6 |
| 3,798,014 | 3/1974 | Bondarev | 65/33 |
| 3,804,608 | 4/1974 | Gaskell | 65/33 |
| 3,847,582 | 11/1974 | Kozmin | 65/33 |

FOREIGN PATENTS OR APPLICATIONS

1,133,010  11/1968  United Kingdom .............. 106/39.6

*Primary Examiner*—S. Leon Bashore
*Assistant Examiner*—Frank W. Miga

[57] ABSTRACT

Solid coal combustion products, fly ash, mine tailings or the like coal byproducts are melted after their composition is adjusted to contain 40–60% $SiO_2$; 15–40% trivalent oxides, mainly those of iron and aluminum; and 11–35% mono- and divalent oxides. After melting at 1,350°–1,500°C until the melt is substantially fined, the material is molded at 1,200°–1,400°C, then is crystallized between 900° and 1,300°C and then the crystallized object is cooled. The product contains a feldspar which is either 55–75% labradorite or 50–70% plagioclase, also 4–20% monoclinic and rhombic pyroxenes, and 2–25% oxides mainly having a spinel structure and ferric oxide modifications. Depending on the starting composition and the heat treatment that is employed, different crystal associations are obtained some of which are more useful as architectural paneling and the like, while others are more useful as items with good chemical durability.

8 Claims, 6 Drawing Figures

ARTIFICIAL STONE AND METHOD FOR MAKING THE STONE FROM A COAL BYPRODUCT

This is a continuation of application for U.S. Ser. No. 279,253, filed on 9 Aug. 1972, now abandoned, which, in turn, is a continuation-in-part of applications for U.S. Ser. Nos. 27,450 and 27,461, both filed on 10 Apr. 1970, now abandoned.

The present invention relates to a synthetic crystalline stone and to process for making the same, more particularly, the present invention relates to a synthetic stone product which is made from the slag produced in the combustion of coal, of fly ash, from coal mine tailings or from like coal byproducts.

Coal mine tailings create large disposal problems at the mine head and there is a history of numerous catastrophic incidents due to dislocations or collapse of large heaps of tailings near mining towns. The vicinity of thermal power plants and other large users of coal is usually recognizable by high slag heaps or, if slag heaps are not in evidence, the disposal of the coal combustion products and/or fly ash is accomplished at large cost of shipping and other disposal methods. Some of these materials have been utilized to some extent in the manufacture of hydraulic cements, as fillers for low grade building products and as fill in construction grading, however, the low cost of the products in which these materials have been used do not make their shipping economical but only for very short distances if at all.

We have discovered that industrial coal combustion products, fly ash, mine tailings and like coal byproducts, usually having the common characteristic of having a melting point under 1,500°C, are suitable as the starting material for a synthetic, spontaneously crystallizable stone product of improved and highly useful characteristics. Raw materials of this type are referred to hereinafter in the specification and the claims as "coal byproducts".

Natural magmatic rock products, such as of molten basalt, have been made before. Products of this type are generally known for their strength, resistance to wear, refractoriness and resistance to acids and bases. Natural magmatic rocks, such as basalt, fonolite and diabase are generally processed by crushing, melting and forming during which last step the material generally recrystallizes from the melt.

The use of recrystallized natural rocks has the drawback, among others, that they are hard and are difficult to polish, therefore, the concealed defects which can be noticed only after costly processing, result in a poor selection of useful product. Softer, more easily polishable materials like marble or other denser limestones relatively easily loose their lustre. Natural magmatic rocks often contain metal sulfides and like components which decompose due to the action of humidity, while often sulfuric and other mineral acids are formed.

It is an object of the present invention to provide a process and product wherein byproducts of coal combustion or coal mining are used and, depending on the starting composition and the intervening heat treatment, novel crystalline artificial stone products are obtained.

In accordance with the present invention a crystalline artificial stone is produced, comprising from about 55% to about 75% labradorite or plagioclase feldspar which contains from about 10% to about 40% albite and from about 60% to about 90% anortite; also from about 4% to about 20% pyroxenes; and from about 2% to about 25% oxides mainly having a spinel structure and containing ferric oxide modifications. As used in the specification and the claims, all parts and percentages, unless otherwise stated, are by weight.

Depending on the starting composition and the nature of the heat treatment during manufacture various kinds of the artificial stone of the present invention are obtained, particularly two principal kinds of embodiments. One of the principal kinds of embodiments is a microcristalline material which comprises from about 55% to about 75% labradorite of which from about 30% to about 40% is albite and from about 60% to about 70% is anortite; from about 5% to about 10% monoclinic pyroxenes and from about 1% to about 10% rhombic pyroxenes; and from about 2% to about 25% oxides having mainly spinel structure and comprised principally of $Fe_2O_3$ modifications, the material containing crystal associations having an average size of from about 0.002mm to about 0.02mm. The other of the principal kinds of embodiments of the artificial stone of the present invention is a holocrystalline material comprising from about 55% to about 70% plagioclase of which from about 10% to about 30% is albite and from about 70% to about 90% is anortite; from about 4% to about 20% pyroxenes, mainly of the enstatite-bronzite rhombic type and Ca, Mg and Fe-containing monoclinic pyroxene; and from about 5% to about 25% oxides having mainly spinel structure, the material containing crystal associations having an average size of from about 0.1mm to about 20mm.

In accordance with the process of the present invention the composition of the coal byproduct starting material is adjusted by the use of appropriate additives to obtain a starting composition of from about 40% to about 60% $SiO_2$; from about 15% to about 40% trivalent oxides, mainly alumina and ferric oxide; and from about 11% to about 35% of mono-and divalent oxides; melting the starting composition at a temperature between 1,350°C and 1,500°C until the contained gases are substantially removed from the melt; molding objects from the resulting melt at a temperature between 1,200°C and 1,400°C; crystallizing the molded object at a temperature between 900°C and 1,300°C for a period of from about 0.5 hour to about 6 hours; and cooling the resulting crystallized product. It is to be understood that although it is practical to form the melt into objects, such as by casting plates therefrom or otherwise such as by pressing, at the time it has been substantially fined by the removal of gases, the melt may also be rested or even cooled for storage and later remelting and crystallization.

The aforementioned two principal kinds of embodiments of the stone product of the present invention can be prepared by different embodiments of the process of the present invention. The microcrystalline stone product can be prepared by adjusting the composition of coal byproducts to obtain a starting composition of from about 45% to about 60% $SiO_2$, from about 15% to about 40% trivalent oxides of which at least about 40% is $Fe_2O_3$, from about 10% to about 20% mono-and divalent metal oxides, and from about 1% to about 5% monovalent alkali oxides; melting the starting composition between about 1,350°C and about 1,500°C until the contained gases are substantially removed from the melt; forming the resulting melt into objects, at a temperature between about 1,200°C and 1,350°C; crystallizing the formed objects at temperatures between about 900°C and about 1,200°C for a period of from about 0.5 hours to about 6 hours; and cooling the resulting crystallized object.

The holocrystalline kind of embodiment of the artificial stone compositions of the present invention can be obtained by adjusting the composition of coal byproducts to obtain a starting composition of from about 40% to about 50% $SiO_2$, from about 20% to about 40% trivalent oxides of which at least about 55% is $Al_2O_3$, and from about 10% to about 35% mono-and divalent oxides; melting the starting composition between about 1,400°C and about 1,500°C until the contained gases are substantially removed from the melt; forming the resulting melt into objects, at a temperature between about 1,300°C and about 1,400°C; crystallizing the formed objects at temperatures between about 1,150°C and about 1,300°C for a period of from about 0.5 hour to about 2 hours; and cooling the resulting crystallized object.

Further features of the present invention are described in the following detailed disclosure, with reference being had to the accompanying drawing, wherein FIG. 1 is a phase diagram illustrating the starting composition ranges that can be employed in making the artificial stone of the present invention;

FIGS. 2 through 6 are diagrams detailing the parameters of various illustrative processing steps in preparing the various embodiments of the artificial stone of the present invention.

In accordance with the present invention the starting material is a coal byproduct such as a coal-containing sedimentary rock, caustobiolites and other like materials usually present in coal mine tailings, slag obtained from the combustion of coal such as in a slag-fusing furnace, fly ash and the like. If the coal byproduct contains any unburned coal, this can be advantageously utilized to reduce the caloric requirements of the subsequent melting step. This advantageous feature of the present invention permits a looser control of the processes used in obtaining the coal byproduct, since the coal content of the byproduct will not be wasted.

In FIG. 1 also some typical slag and fly ash compositions are illustrated by respectively identified arrows. The given composition of the coal byproduct can be adjusted by the addition of any desired material to obtain the aforementioned starting composition, as also shown within the area bordered in heavy lines in FIG. 1 and defined by corner points marked with the letters from A to H. Suitably a variety of mineral ingredients can be employed for the adjustment of the composition of the coal byproduct, such as natural magmatic rocks; wehrlite, basalt, diabase or basalt tuff for adding iron, titanium and magnesium; phonolite or trachite for adding alkali oxides; aplite, rhyolite tuff or feldspar for adding $SiO_2$; Ca-and Mg-containing sedimentary rocks, such as dolomite, limestone or marl to add divalent oxides; and bauxite or red mud from bauxite processing for adding alumina and ferric oxide. Typical compositions of such natural additives are shown in the following table.

|  | wehrlite | basalt | diabase | phonolite | trachite | applite | riolite tuff | dolomite | limestone | bauxite | red mud |
|---|---|---|---|---|---|---|---|---|---|---|---|
| $SiO_2$ | 31.25 | 43.18 | 48.48 | 58.36 | 65.25 | 77.47 | 67.77 | 0.5 | 3.2 | 7.81 | 1.3 |
| $TiO_2$ | 12.06 | 3.59 | 1.7 | — | 0.7 | 0.01 | 0.32 | — | 1.06 |  | 6.5 |
| $Al_2O_3$ | 4.43 | 9.86 | 15.06 | 21.82 | 14.23 | 12.62 | 15.53 | 0.5 | 1.0 | 49.73 | 16.6 |
| $Fe_2O_3$ | 4.32 | 7.21 | 2.7 | 3.0 | 5.04 | 0.5 | 2.17 |  | 0.0 | 20.6 | 39.6 |
| FeO | 24.95 | 6.0 | 8.19 | 1.08 | 0.33 | 0.59 | 0.49 |  | 0.36 |  |  |
| MnO | 0.44 |  | 0.09 |  |  | 0.03 | 0.06 |  |  |  | 0.2 |
| MgO | 14.85 | 11.56 | 6.28 | 1.4 | 0.27 | tr. | 0.71 | 20.3 | 2.9 | 0.4 | 1.2 |
| CaO | 4.5 | 11.32 | 9.92 | 1.64 | 0.71 | 0.12 | 2.53 | 30.64 | 49.9 | 1.12 | 1.4 |
| $Na_2O$ | 0.4 | 2.24 | 3.89 | 7.26 | 3.56 | 2.23 | 2.45 | 0.43 |  |  | 11.2 |
| $R_2O$ | 0.1 | 1.19 | 0.27 | 2.05 | 6.07 | 4.88 | 3.0 |  |  |  |  |
| $P_2O_5$ | 0.01 | 0.71 | 0.25 |  |  | 0.71 | tr. |  |  |  |  |
| $H_2O$ + |  | 2.07 | 1.99 |  |  | 2.08 | 0.24 |  |  |  |  |
| $H_2O$ − |  | 1.27 | 0.94 |  |  | 0.83 | 1.55 |  |  |  |  |
| $CO_2$ |  | SrO | 0.03 |  |  |  | 0.19 |  | 42.0 | $SO_3$ | 1.2 |
| Ign. loss | 2.85 |  |  |  | 2.53 |  | 5.53 | 47.19 |  |  | 9.8 |

In the case of higher alumina content which would increase the melting temperature for optimum viscosity for fining the melt, fluxes, such as fluorides and/or carbonates can be used, for example, cryolite, fluorite, Ca-Mg-, Na-, or potassium carbonates, limestone, dolomite, ankerite, siderite and magnesium carbonate ore. If color and surface reflection characteristics of the final product are to be influenced, additives containing ferric oxide and titanium oxide, such as red mud or wehrlite can be added in concentrations of up to about 5% based on the starting composition.

The sequence of the steps of the process of the present invention can be varied in some instances. For example, the adjusting of the composition of the coal byproduct starting material can be carried out, depending on the compositions involved, before, during or after the melting. Furthermore, some of the composition-adjusting ingredients can be added at different points relative to the melting step, to the coal byproduct base ingredient. If composition-adjusting ingredients are added at the beginning of, or before the, melting step and if coal is added to the coal byproduct, all these ingredients can be added together to the byproduct, for better homogeneity of the melt.

If the coal byproduct that is employed is obtained during the combustion of coal, then the caloric balance of the process of the present invention can be improved if the coal byproduct is employed still while hot, such as slag at 800°C – 1,000°C or fly ash at about 100°C.

In the melting of the starting composition its combustible content may be utilized to substitute for, or supplement the, exterior source of heat. If desired for any particular melting technique, fuel, such as coal can also be added to the starting composition. The melt is maintained in the melting temperature range for refining the melt, i.e. substantially to remove its gas content which is present in the form of bubbles. Thereafter objects are molded from the melt, such as by casting or any other convenient method for the particular shape intended to be formed. Generally the forming from the melt is accomplished at a temperature below the melting temperature range, since for most molding techniques a higher viscosity is required than the viscosity required for melting and fining the melt. The steps of melting, fining and molding can be carried out in a generally known manner.

A large variety of materials are known which are generally referred to as "glass-ceramics". These materials are batched, melted, formed and annealed as glasses. Their compositions are within so called glass-forming ranges, i.e. within portions of their respective phase diagrams which denote areas within which stable glasses can be obtained. These glasses contain nucleating agents so that if the shaped glass object is reheated and subjected to a critical devitrifying heat treatment schedule, these nucleating agents provide locations at which devitrification will commence, ultimately resulting in an object having mixed glassy and ceramic phases. The artificial stone of the present invention is an entirely different kind of material, because it is not a glassforming composition, but one which, without the aid of any nucleating agents, will spontaneously crystallize upon cooling from a melt.

It is desirable to control the crystallization according to preselected parameters to obtain the desired crystal associations and their attendant purpose-oriented physical properties. Depending on the desired average size of the ultimate crystal associations the crystallization is carried out for larger average crystal sizes at about 1,200°C – 1,300°C, and for smaller sizes at about 1,150°C – 1,200°C. The crystallization heat treatment can be carried out either batchwise or in a continuous manner, by any known technique or apparatus. If the formed object is cooled gradually, such as within about 1–2 hours from the molding temperature such as 1,350°C to a crystallization temperature such as 1,150°C – 1,200°C, the resulting average crystal size will be larger than if the formed object would have been cooled faster to the latter temperature. Generally, if the mass to be crystallized is rather held during crystallization at a constant temperature than being cooled at a controlled rate, the resulting crystal sizes will tend to be larger. For the holocrystalline embodiment of the artificial stone of the present invention it is predominantly such a crystallization treatment which is more suitable. The microcrystalline embodiments of the artificial stone of the present invention are more suitably prepared by cooling the formed objects at a controlled rate during crystal formation. Depending on the character of the ultimately desired crystalline form the crystallizing heat treatment can be carried out in from about 0.5 to about 6 hours.

The crystallizing heat treatment schedule will not only affect the size of the resulting crystal associations, but also its composition and character. For example, anortite will more readily crystallize at higher temperatures than albite, therefore, longer holding at higher crystallization temperatures will result predominantly in the formation of anortite rather than of albite. Since among these plagioclase feldspars anortite ($CaAlSi_2O_8$) contains 43.4% $SiO_2$ and albite ($NaAlSi_3O_8$) contains 68.2% $SiO_2$, the practical effect of varying crystallization schedules can be readily seen.

Further details concerning the step of crystallization with respect to various embodiments of the present invention, are given in the specific examples later in this disclosure. It can be readily understood, however, that no absolute prescriptions can be given for the preparation of all suitable embodiments of the present invention, but, based on the herein disclosed principles and also on the specific details disclosed herein, optimum crystallization schedules can be worked out by a minor amount of routine experimentation within the scope of the present invention, for preparing various artificial stone embodiments thereof.

After crystallization is completed, the resulting product can be cooled at a convenient rate, suitably at a rate of 20°C/hour to 400°C/hour, depending on the particular composition.

The products of the present invention have favorable mechanical and chemical properties which permit their utilization for a large variety of purposes. The versatility of forming from a melt, permits the embedding of structural materials, such as steel rods, into the products of the present invention. The artificial stone of the present invention is a good thermal and electrical insulator and has good chemical durability with respect to acids and bases.

Although petrographic and chemical compositions of the products of the present invention may, in some instances, approximate those of some natural magmatic rocks, the artificial stone of the present invention has greater homogeneity and the processing parameters in accordance with the present invention permit great flexibilities in varying the properties of the end product. The melt casting technique employed in the process of the present invention provides end products having spontaneous fire polish, while natural magmatic rocks have to be sliced, ground and polished to obtain shiny panels such as for architectural applications.

The physical and chemical properties of the artificial stone of the present invention are generally:

| | |
|---|---|
| specific gravity | 2.96–2.998 g/cm³ |
| bulk density | 2.71–2.864 g/cm³ |
| water absorbtivity | 0.186–0.268% |
| crystallization in saturated $MgSO_4$ | 0.03–0.062% |
| acid resistance in mixture of boiling hydrochloric and nitric acids | 0.21 0.352% |
| compressive strength | |
| in air-dried condition | 2,500–5,000 kg/cm² |
| saturated with water | 2,000–4,500 kg/cm² |
| after 25 freeze-thaw cycles | 1,500–4,000 kg/cm² |
| bending strength | 260–300 kp/cm² |
| modulus of elasticity | 490,000–780,000 kp/cm² |
| coefficient of thermal expansion is in the area of | $12 \times 10^{-6}$ mm/mm/°C |
| thermal conductivity is in the area of | 1.12 kcal/h/°C |

The following examples are illustrative of the best mode contemplated for carrying out the present invention. All parts and percentages are by weight, unless otherwise stated.

EXAMPLE 1

A Hungarian brown coal from Tatabanya, having a calorimetric value of 3500 cal. is burned in a furnace on a traveling grate at a temperature between 1250°C and 1300°C. The slag which leaves the grate at a temperature between 900°C and 1000°C, has the following composition

| | |
|---|---|
| $SiO_2$ | 40–48% |
| $TiO_2$ | 0–1% |
| $Fe_2O_3$ | 7–12% |
| $Al_2O_3$ | 30–38% |
| FeO | 0–1% |
| MnO | 0–0.1% |
| Mgo | 1–4% |
| CaO | 2–10% |
| $Na_2O$ | 0–1.5% |
| $K_2O$ | 0–1.5% |
| $P_2O_5$ | 0–0.1% |
| $SO_3$ | 2–4.5% |

Figure 2:
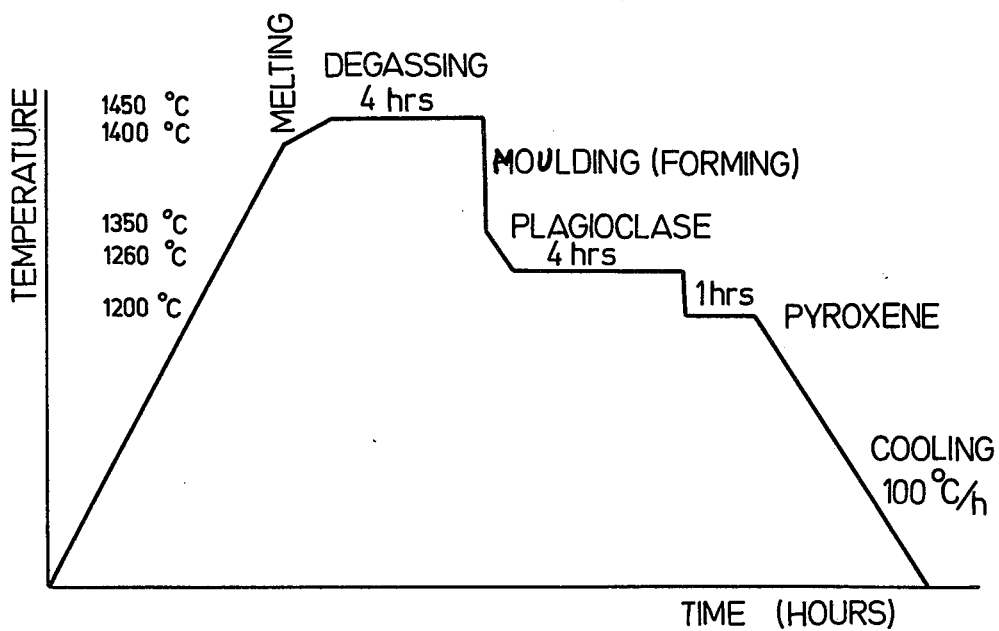
Figure 3:
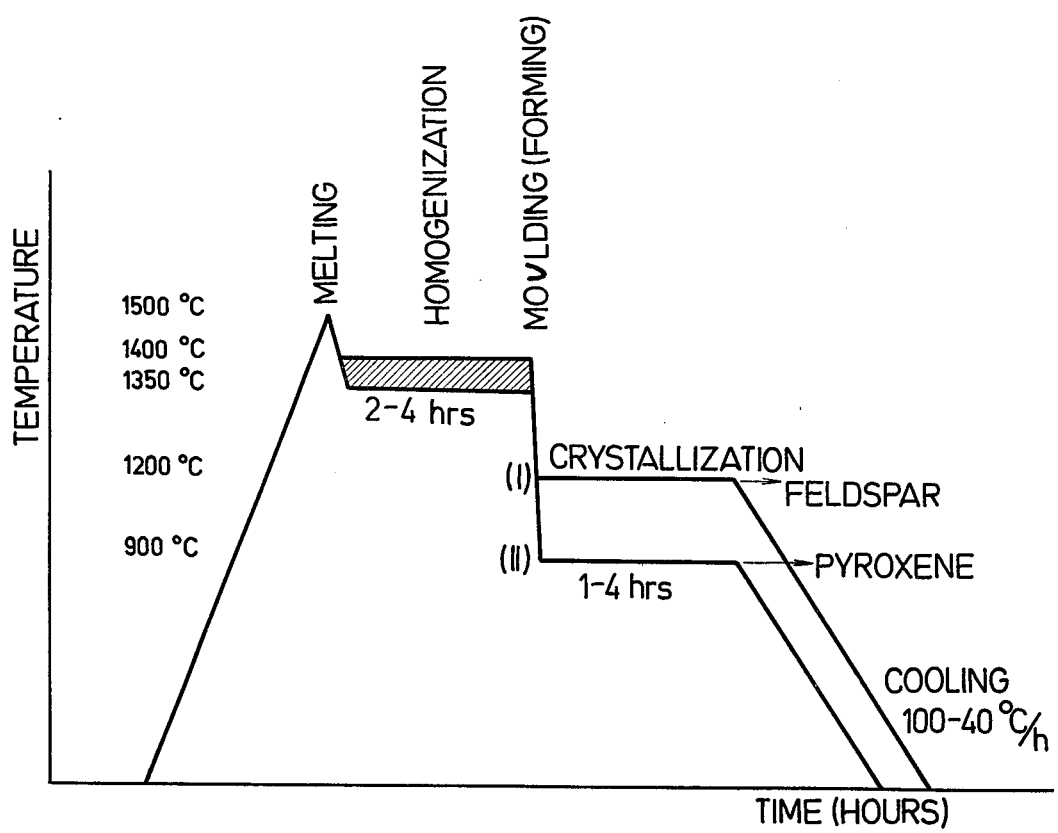

To each 70 parts of slag 15 parts of wehrlite, 8 parts of cryolite are added. As shown in FIG. 2, the mixture is melted at 1350°C – 1400°C and the melt is then allowed to rest at 1450°C until the inherent gases are substantially removed. The crystallization is carried out by holding for a period of 4 hours at 1260°C and for 1 hour at 1200°C and then the melt is cooled for 10 hours.

The composition of the product is:

| | |
|---|---|
| plagioclase (albite 30%; anortite 70%) | 60% |
| rhombic pyroxene | 6% |
| Fe₂O₃ modifications and spinel-structured oxides | 28% |
| crypto-microcrystalline substance having a grain size of 1–5nm | 6% |

The product has a trachytic texture and 42% of the crystals has a grain size of 0.2 – 2 mm.

EXAMPLE 2

To 87 parts of the slag of Example 1, 10 parts of dolomite, 2 parts of cryolite, 1 part of nickel oxide are added.

The mixture is melted at 1400°C – 1450°C, subsequently it is allowed to rest at 1450°C and then it is crystallized for 6 hours at 1250°C–1200°C and cooled for 14 hours.

The composition of the product is:

| | |
|---|---|
| plagioclase (albite 12%; anortite 88%) | 60% |
| rhombic pyroxene | 10% |
| spinel-structured oxides | 25% |
| microcrystalline substance of 1–5 nm grain-size | 5% |

The product has a micro-holocrystalline texture, 40 % of the crystals have a grain size of 0.1–1 mm.

EXAMPLE 3

Figure 4:
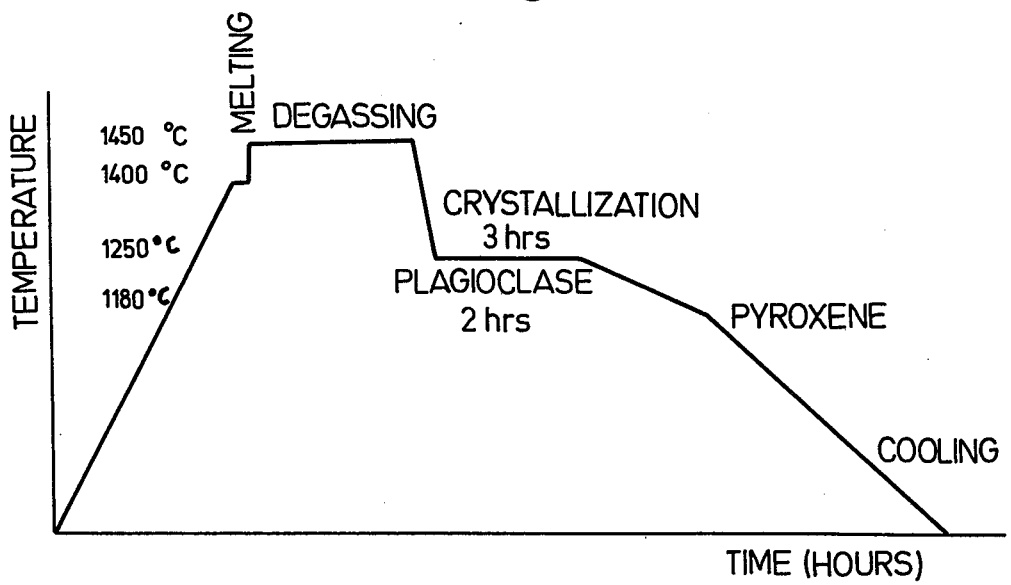
Figure 5:
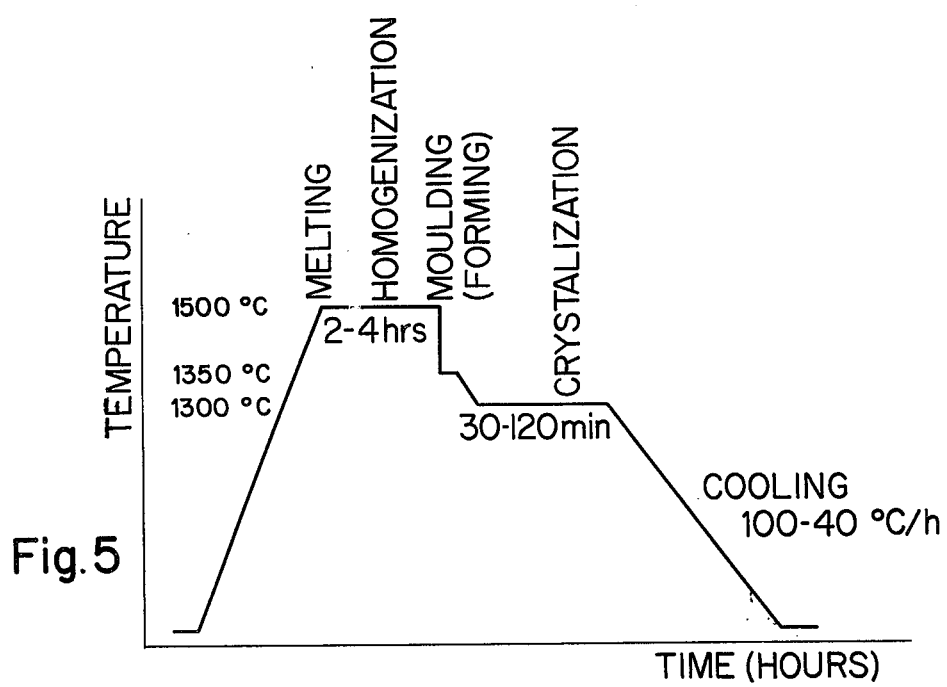
Figure 6:
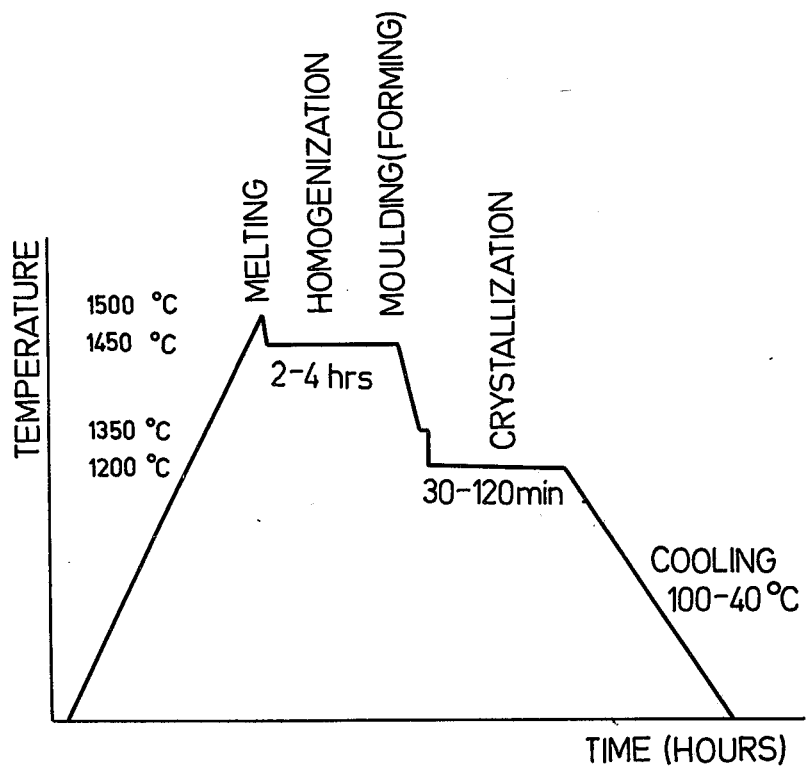

To 90.0 parts of the slag of Example 1, 6 parts dolomite, 3 parts sodium carbonate and 1.0 part nickel oxide are added. As shown in FIG. 4, the mixture is melted at 1400°C, subsequently it is allowed to rest at 1450°C, after molding it is crystallized at 1250°C for 3 hours and subsequently slowly cooled for 2 hours from 1250°C to 1180°C. Finally, the crystallized mixture is cooled for 10 hours.

The composition of the product is:

| | |
|---|---|
| plagioclase (albite 28%; anortite 72%) | 60% |
| rhombic pyroxene | 8% |
| spinel-structured oxides | 20% |
| R₂O₃ (metal oxides) | 7% |
| microcrystalline substance of 1–5 nm grain-size | 5% |

The product has a trachytic texture and 40% of the crystals have a grain size of 0.2–2 mm.

EXAMPLE 4

To 83 parts of the slag of Example 1, 10 parts of dolomite, 5 parts of sodium carbonate and 2 parts of fluorite are added. The mixture is melted at 1400°C, it is then allowed to rest at 1450°C and thereafter it is crystallized at 1250°C for 6 hours. Finally, it is cooled for 14 hours.

The composition of the product is:

| | |
|---|---|
| plagioclase (albite 28%; anortite 72%) | 67% |
| rhombic pyroxene | 16% |
| spinel-structured oxides | 17% |

The product had an intergranular texture, the grain-size of the main bulk of the crystals is 0.4–1 mm, the grain size of the biggest crystals is about 3–4 mm.

EXAMPLE 5

To 89 parts of the slag of Example 1, 8 parts of calcinated dolomite, 2 parts of sodium carbonate and 1 part of fluorite are added. The mixture is melted at a temperature of 1400°C – 1450°C, then it is allowed to stand at 1450°C until fined, and subsequently is crystallized at 1250°C for 4 hours. The crystallized mixture is cooled for 14 hours.

The composition of the product is:

| | |
|---|---|
| plagioclase (albite 12%; anortite 88%) | 68% |
| rhombic pyroxene | 4% |
| spinel-structured oxides | 22% |
| other oxides | 6% |

The artificial rock has an intergranular texture, with the grain size of the biggest crystals being 2–3 mm.

EXAMPLE 6

To 88 parts of the slag of Example 1, the following additives are added: 10 parts of limonitic limestone and 2 parts of sodium carbonate. The starting mixture is melted at 1400°C, then it is allowed to rest at 1440°C and is subsequently crystallized at 1200°C for 30 minutes. Finally, it is cooled for 16 hours.

The composition of the product is:

| | |
|---|---|
| plagioclase (albite 10%; anortite 90%) | 63% |
| rhombic-monoclinic pyroxene | 18% |
| spinel-magnetite | 19% |

The rock has an intergranular texture. The average grain-size of the crystals is 0.1–2 mm, and the grain size of the biggest plagioclase crystals is about 5 mm.

EXAMPLE 7

To 88 parts of the slag of Example 1, 2 parts sodium carbonate and 10 parts of red mud is added, the latter having a chemical composition of 13% SiO₂, 6.5% TiO₂, 16.6% Al₂O₃, 39.6% Fe₂O₃, 0.2% MnO, 1.2% MgO, 1.4% CaO, 11.2% Na₂O, 1.2% SO₃, and 9.8% ignition loss. The processing of the mixture is carried out according to Example 6.

The composition of the product is as follows:

| | |
|---|---|
| plagioclase (albite 20%; anortite 80%) | 60% |
| spinel-structured oxides | 5% |
| R₂O₃-modifications (metal oxides) | 35% |

The product has a trachytic texture. The average grain-size of the crystals is 0.1–1 mm. The grain size of the biggest plagioclase crystals is about 4 mm.

EXAMPLE 8

To 88 parts of the slag of Example 1, 10 parts of siderite and 2 parts of sodium carbonate are added. The mixture is melted at 1400°C, and is then allowed to rest at 1440°C. It is subsequently crystallized at 1200°C for 1 hour. Finally, it is cooled for 16 hours.
The composition of the product is as follows:

| | |
|---|---|
| plagioclase (albite 16%; anortite 84%) | 62% |
| rhombic pyroxene | 5% |
| spinel-structure oxides | 25% |
| other oxides ($Fe_2O_3$-modifications) | 8% |

The product has an intergranular (micro-holocrystalline) texture. The average grain size of the crystals is 0.1–0.5 mm.

EXAMPLE 9

To 88 parts of the slag of Example 1, 7 parts of dolomite, 3 parts of siderite and 2 parts of sodium carbonate are added. The mixture is melted at 1400°C – 1440°C, is allowed to rest at 1440°C until the gases are removed and subsequently it is molded at 1400°C and crystallized at 1200°C for 30 minutes. The crystallized mixture is then cooled for 16 hours.
The composition of the product is:

| | |
|---|---|
| plagioclase (albite 12%; anortite 88%) | 68% |
| monoclinic pyroxene | 16% |
| spinelle-structured oxides | 16% |

The artificial rock has an intergranular (micro-holocrystalline) texture. The average grain size of the crystals is 0.1–1 mm.

EXAMPLE 10

To 88 parts of the slag of Example 1, 7 parts of dolomite, 3 parts of siderite and 2 parts of sodium carbonate are added. The mixture is melted at 1400°C, it is allowed to rest at 1450°C and subsequently is crystallized at 1250°C for 1 hour. Finally, it is cooled for 17 hours.
The composition of the product is:

| | |
|---|---|
| plagioclase (albite 12%; anortite 88%) | 68% |
| monoclinic pyroxene | 16% |
| spinel-structured oxides | 16% |

The artificial rock has an intergranular (micro-holocrystalline) texture. The average grain-size of the plagioclase crystals is 0.5–2 mm. The grain size of the biggest crystals is 3–4 mm.

EXAMPLE 11

To 90 parts of the slag of Example 1, 8 parts of limonitic limestone and 2 parts of sodium carbonate are added. The mixture is melted at 1400°C, then rested at 1420°C, molded at 1400°C and subsequently crystallized at 1200°C for 90 minutes. The crystallized mixture is then cooled for 18 hours.
The composition of the product is:

| | |
|---|---|
| plagioclase (albite 10%; anortite 90%) | 65% |
| monoclinic pyroxene | 17% |
| spinel-structured oxides | 8% |
| other oxides | 10% |

The artificial rock has an intergranular texture. The grain size of the biggest crystals is 3–4 mm.

EXAMPLE 12

7 parts of limonitic limestone and 3 parts of sodium chloride are added to 90 parts of the slag of Example 1. The mixture is melted at 1400°C – 1420°C, then is allowed to rest at 1440°C, cast at 1400°C and is subsequently crystallized at 1200°C for 1 hour. Finally it is cooled for 18 hours.
The composition of the product is:

| | |
|---|---|
| plagioclase (albite 15%; anortite 85%) | 66% |
| monoclinic pyroxene | 8% |
| oxides | 26% |

The artificial stone has an intergranular texture. The grain size of the biggest plagoclase crystals is about 3–4 mm.

EXAMPLE 13

To 89 parts of the slag of Example 1, 8 parts of dolomite and 3 parts of sodium carbonate are added. The mixture is melted at 1400°C – 1450°C, is rested at the same temperature and is subsequently crystallized at 1200°C for 90 minutes. The crystallized mixture is cooled for 15 hours at a rate of 100° – 60 °C/h. The size of the bulk of the plagioclase crystals in the end product is about 1–2 mm.

EXAMPLE 14

A mixture of 75 parts of the slag of Example 1, 10 parts of diabase and 15 parts of dolomite is melted at 1400°C. The melt is allowed to rest at 1440°C and is then cooled for 16 hours from 1250°C to 100°C at a rate of 100° – 60 °C/h. The bulk of the very hard and compact product is composed predominantly of plagioclase crystals. The size of these crystals is about 0.5–2.0 mm. By the admixture of the above-mentioned additives the melting point and the resting time are decreased.

EXAMPLE 15

A mixture of 80 parts of the slag of Example 1, 10 parts of wehrlite and 10 parts of dolomite are melted at a temperature of 1380°C – 1400°C and then allowed to rest at 1420°C – 1440°C. After casting it is cooled in two steps to 1100°C, at a rate of 100°C/h, then from 1100°C at a rate of 100°–50°C/h. The size of the biggest crystal of the coarse-grained plagioclase part of the mixture is about 10 mm. The average grain size is about 3–5 mm.

EXAMPLE 16

80 parts of the slag of Example 1, 10 parts of red mud, 10 parts of dolomite are melted at about 1380°C – 1400°C, then rested at 1420°C – 1440°C. After molding the object is cooled to 1100°C at a rate of 100°C/h, and then under 1100°C at a rate of 100°–50°C/h. The maximum size of the plagioclase crystals in the coarse crystalline product is about 10 mm. The average grain size of the crystals is about 3–6 mm.

EXAMPLE 17

To 85 parts of a low Ca-and Mg-containing slag from a thermal power station and having the composition of 51.9% $SiO_2$, 31.1% $Al_2O_3$, 11.6% $Fe_2O$, 1.6% CaO, 2.1% MgO, 0.8% $SO_3$, there are added 15 parts of dolomite. The mixture is melted at 1350°C – 1400°C, then rested at 1400°C – 1420°C. The melt is subsequently crystallized at 1150°C for 2 hours and cooled for 18 hours at a rate of 100°–50°C/h. The average grain size of the plate-like plagioclase crystals of the end product is about 3–5 mm.

EXAMPLE 18

The composition of the starting material is 80 parts of the slag of Example 17 and 20 parts of limestone. The mixture is melted at 1350°C – 1400°C and is allowed to rest at 1410°C – 1430°C. It is then crystallized for 1 hour at 1150°C and cooled for 18 hours at a rate of 100°–50°C/h. The bulk of the plate-like plagioclase crystals has a size of about 3–6 mm.

EXAMPLE 19

To 75 parts of fly ash having a relatively low Ca, Mg and Fe content, and a composition of 55.8% $SiO_2$, 30.3% $Al_2O_3$, 7.2% $Fe_2O_3$, 2.1% MgO, 3.1% CaO, and 0.8% $SO_3$, there are added 10 parts of wehrlite and 15 parts of dolomite. The mixture is melted at 1350°C and allowed to rest at 1380°C. The melt is then crystallized for 4 hours at 1200°C – 1180°C, then between the temperature range of 1180°C – 1000°C at a rate of 100°C/h, and below 1000°C at a rate of 100°–50°C/h. The maximum diameter of the plate-like plagioclase crystals is about 20 mm. The average grain size is 4–8 mm.

EXAMPLE 20

80 parts of the fly ash of Example 19, 10 parts of wehrlite, 10 parts of dolomite are mixed and melted at 1350°C – 1400°C, then rested at 1410°C. The melt is crystallized for 2 hours at 1200°C – 1100°C. The maximum size of the plate-like plagioclase crystals of the compact deep-grey product is about 10 mm. The average grain size is 3–5 mm.

EXAMPLE 21

75 parts of the fly ash of Example 19, 10 parts of wehrlite, and 15 parts of limestone are mixed. The mixture is then melted at 1300°C – 1330°C, and rested at 1150°C. It is then crystallized for 2 hours at 1150°C and cooled for 17–18 hours at a rate of 100°–50°C/h. In this way a very hard, deep-grey product with relatively uniformly sized grains is obtained.

EXAMPLE 22

5% bauxite is added to fly ash containing 49.0% $SiO_2$, 17.5% $Al_2O_3$, 19.3% $Fe_2O_3$, 2.2% MgO, 7.7% CaO, 2.0% $Na_2O$, and 2.7% $SO_3$. The mixture is melted at 1300°C then allowed to stand at 1350°C – 1360°C. After casting it is crystallized 3 hours at 1150°C and after crystallization the material is cooled at a rate of 80°–60°C/h. The average grain size of the crystalline product is about 5–20 nm.

EXAMPLE 23

5% bauxite and 5% loamy manganese carbonate sedimentary rock are added to the fly ash of Example 22, melted at 1320°C, then rested at 1350°C. After casting it is crystallized for 3 hours at 1150°C and subsequently the material is cooled at a rate of 100–50°C/h. The average grain size of the product is about 2–20 nm.

EXAMPLE 24

To the fly ash of Example 22, 5% by weight of loamy manganese carbonate sedimentary rock is added. The mixture is melted at 1250°C – 1300°C, it is rested at 1320°C – 1350°C. It is then crystallized for 3 hours at 1150°C – 1120°C and cooled for 18 hours. The grain size of the average part of the thoroughly crystalline product is about 5–15 nm.

EXAMPLE 25

To fly ash containing 55.8% $SiO_2$, 30.3% $Al_2O_3$, 7.2% $Fe_2O_3$, 2.1% MgO, 3.1% CaO, 1.0% $Na_2O$ and 0.8% $SO_3$, there was added 10% limonite limestone, 3% sodium carbonate and 2% loamy manganese carbonate sedimentary rock. The mixture is melted at 1400°C, then is rested at 1440°C. After casting it is crystallized for 1 hour at 1200°C and subsequently it is cooled between 1200°C and 1000°C at a rate of 100°C/h, and under 1000°C at a rate of 80°–50°C/h. The predominant part of the product has a microcrystalline texture.

We claim:

1. A process for making artificial stone, which comprises:
    a. adjusting the composition of a coal byproduct having a melting point not higher than approximately 1500°C, with at least one chemical ingredient which contains, expressed as an oxide, at least one member selected from the group consisting of $SiO_2$, $Al_2O_3$, $Fe_2O_3$, FeO, MnO, CaO, MgO, $Na_2O$, and $K_2O$, to obtain a starting composition which is contained within the area demarcated with bold lines in the phase diagram of FIG. 1 and is defined by corner points marked with the letters from A to H;
    b. melting the starting composition between about 1,350°C and about 1,500°C until the contained gases are substantially removed from the melt;
    c. forming the resulting melt into objects at a temperature between about 1,200°C and about 1,400°C; then without the need for reheating
    d. crystallizing the formed object at a temperature between about 900°C and about 1,300°C for a period of from about 0.5 hour to about 6 hours; and
    e. cooling the resulting crystallized object.

2. The process of claim 1, wherein the starting composition contains (a) from about 45% to about 60% $SiO_2$; (b) from about 15% to about 40% trivalent oxides from among said chemical ingredients, at least 40% of said trivalent oxides being $Fe_2O_3$; and (c) from about 15% to about 35% mono-and-divalent oxides from among said chemical ingredients, from about 10% to about 20% of said mono-and-divalent oxides being divalent oxides, and from about 1% to about 5% of said mono-and-divalent oxides being monovalent alkali oxides.

3. The process of claim 1, wherein (a) the $SiO_2$ content of the starting composition is from about 40% to about 50%; and (b) the starting composition contains from about 20% to about 40% trivalent oxides from among said chemical ingredients, at least 55% of said preceeding trivalent oxides being $Al_2O_3$.

4. The process of claim 3, wherein (a) the starting composition is melted between about 1,400°C and about 1,500°C; (b) the melt is formed at a temperature between about 1,300°C and about 1,400°C; and (c) the crystallizing is carried out at temperatures between about 1,150°C and about 1,300°C.

5. The process of claim 4, wherein said crystallizing is carried out during a period of between about 0.5 hours and about 2 hours.

6. The process of claim 1, wherein the combustible content of the coal byproduct is utilized in said step of melting.

7. The process of claim 4, wherein the chemical ingredient used to adjust the composition of the coal byproduct, is one or more of the following ankerite, siderite, limestone, dolomite, magnesium carbonate ore, bauxite, red mud, wehrlite, phonolite, granite, aplite, tuff, marl, and sandstone.

8. The product made with the process of claim 1.

* * * * *